(12) United States Patent
Foster et al.

(10) Patent No.: US 6,359,982 B1
(45) Date of Patent: Mar. 19, 2002

(54) METHODS AND APPARATUS FOR DETERMINING MEASURES OF AGENT-RELATED OCCUPANCY IN A CALL CENTER

(75) Inventors: Robin H. Foster, Little Silver, NJ (US); Roy A. Jensen, Westminster; Joylee E. Kohler, Northglenn, both of CO (US); Eugene P. Mathews, Barrington, IL (US)

(73) Assignee: Avaya Technologies Corp., Basking Ridge, NJ (US)

( * ) Notice: Subject to any disclaimer, the term of this patent is extended or adjusted under 35 U.S.C. 154(b) by 0 days.

(21) Appl. No.: 09/228,992

(22) Filed: Jan. 12, 1999

(51) Int. Cl.[7] ............................................. H04M 3/42
(52) U.S. Cl. ........................... 379/266.06; 379/265.1
(58) Field of Search .......................... 379/265.1, 266.06, 379/309

(56) References Cited

U.S. PATENT DOCUMENTS

| | | |
|---|---|---|
| 4,694,483 A | 9/1987 | Cheung |
| 5,206,903 A | 4/1993 | Kohler et al. |
| 5,828,747 A | 10/1998 | Fisher et al. |

FOREIGN PATENT DOCUMENTS

WO    WO 92/09164    5/1992

*Primary Examiner*—Creighton Smith
(74) *Attorney, Agent, or Firm*—Evans, Mason & Lewis, LLP

(57) ABSTRACT

A call center is configured to include a capability for generating measures of occupancy for one or more agents. At least one value characterizing an occupancy measure determination for a given agent is stored in a memory associated with the call center, and used in generating an occupancy measure for that agent. In an illustrative embodiment, a set of stored values for the given agent includes an initial occupancy value for the agent, expressed in terms of a percentage. The occupancy measure for the agent may then be set to the initial occupancy value upon a log-in by the agent, so as to avoid undue oscillation in the occupancy measure after log-in. The set of stored values for the given agent may also include, for example, a limit which specifies a maximum amount of time for a designated activity which is to be considered as occupied time in generating the occupancy measure, or a limit which specifies a maximum effect of a designated activity in generating the occupancy measure. The designated activity may be, for example, after call work or auxiliary work performed by the agent.

34 Claims, 3 Drawing Sheets

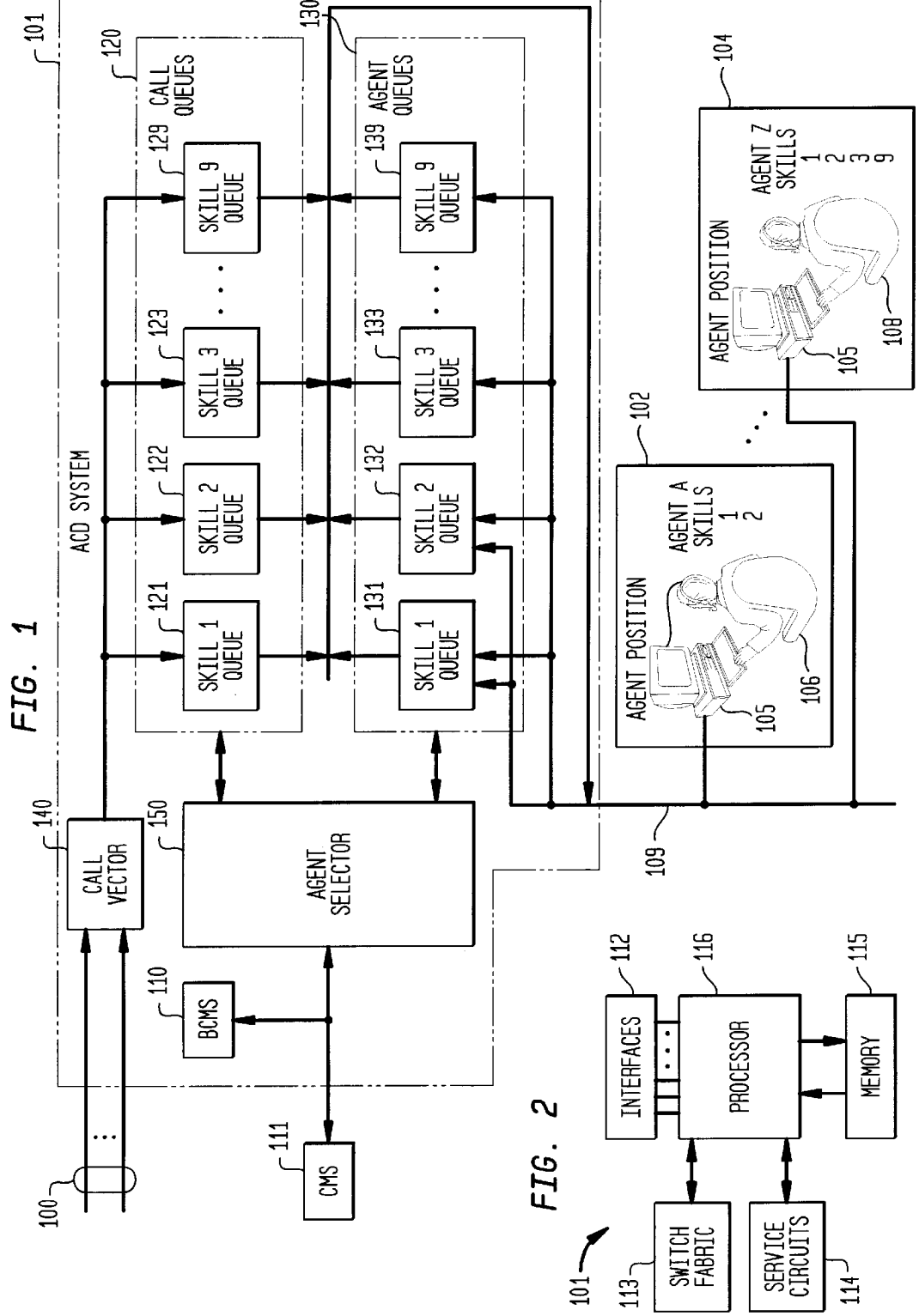

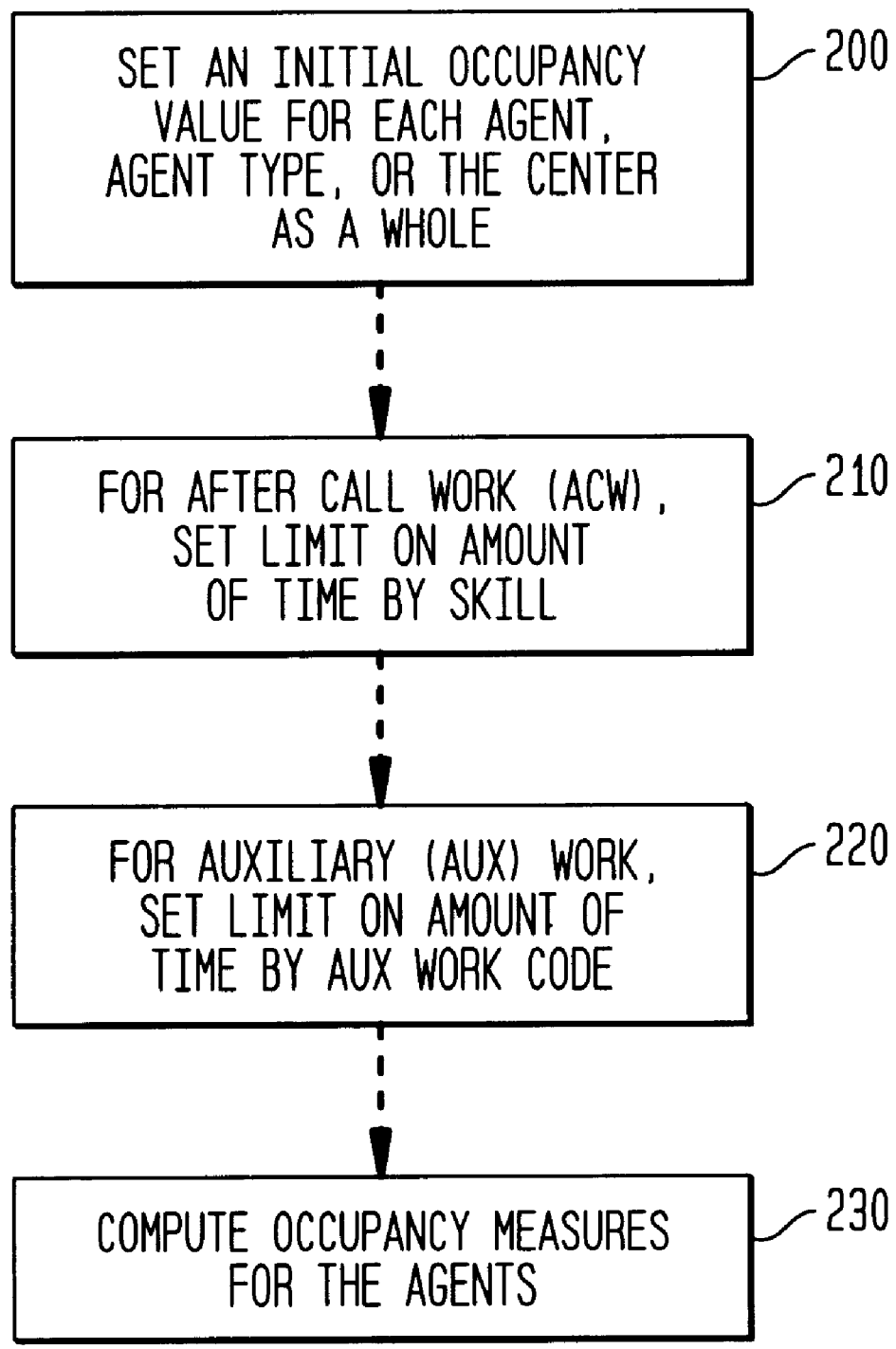

FIG. 4

| | TIME ELAPSED | OCCUPANCY | EVENT | TIME ELAPSED | NEW OCCUPANCY | COMMENTS |
|---|---|---|---|---|---|---|
| | 0:00 | 0% | LOGIN | 0 | 80% | INITIALIZED, OTHERWISE WOULD HAVE BEEN 0 |
| A: | 15 MIN | 84% | AUX 5 FOR 15 MIN | 30 MIN | 87% | WITHOUT LIMIT ON EFFECT, THE OCCUPANCY WOULD HAVE BEEN 92% |
| B: | 30 MIN | 87% | SKILL 7, TALK FOR 6 MIN, ACW FOR 5 MIN | 41 MIN | 83.2% | WITHOUT LIMIT ON EFFECT, THE OCCUPANCY WOULD HAVE BEEN 90.5% |
| C: | 60 MIN | 86% | AUX 4 FOR 20 MIN | 80 MIN | 83.3% | WITHOUT LIMIT ON TIME INCLUDED, THE OCCUPANCY WOULD HAVE BEEN 89.5% |
| D: | 180 MIN | 81% | AUX 6 FOR 45 MIN | 225 MIN | 81% | AUX 6 LUNCH TIME HAS NO EFFECT ON THE OCCUPANCY CALCULATION |

METHODS AND APPARATUS FOR DETERMINING MEASURES OF AGENT-RELATED OCCUPANCY IN A CALL CENTER

FIELD OF THE INVENTION

The invention relates generally to call centers or other call processing systems in which voice calls, e-mails, faxes, voice messages, text messages, Internet service requests or other types of communications are distributed among a number of service agents for handling.

BACKGROUND OF THE INVENTION

Call centers distribute calls and other types of communications to available call-handling service agents in accordance with various predetermined criteria. In existing systems, the criteria for handling a call are often programmable by the operator of the system via a capability known as call vectoring. Typically, when the system detects that an agent has become available to handle a call, the system identifies the call-handling skills of the agent, usually in some order of priority, and delivers to the agent the longest-waiting call that matches the agent's highest-priority skill. In addition, some conventional call distribution techniques focus on being "fair" to agents. This fairness may be reflected, for example, in the use of a "most-idle-agent" agent selection process, for times when a surplus of agents is available to choose from.

Call centers often compute occupancy measures in order to maintain fairness in overall workload for a set of agents. These measures generally attempt to quantify how busy each of the agents are, and are taken into account in call distribution so as to maintain an even workload for these agents. For example, an agent may be selected to handle the next call if his or her occupancy on a percentage basis is lower than that of the other qualified agents.

A significant problem with the use of occupancy measures in conventional systems is that, under certain conditions, the exact measures may not adequately reflect the actual workload of a given agent. For example, when an agent logs in to the system at the beginning of a shift, occupancy measures computed in a conventional manner have a tendency to oscillate widely. In one existing system, the occupancy in percentage terms for a given agent is set automatically to 0% when that agent logs in. The occupancy for the given agent then jumps to a very high value, possibly as high as 100%, if soon after log-in there is a call for that agent to take. After the given agent is finished with the call, the occupancy will then decline until that agent is selected for another call, at which time the occupancy will again begin to rise. As a result of this type of oscillation, it can take an unduly long amount of time for an agent to establish a relatively stable occupancy level.

Similar problems can result when factors such as after call work and auxiliary work are incorporated into the occupancy calculation. This is particularly true if the amount of time associated with the after call work and auxiliary work is relatively large compared to the amount of time already accrued since the beginning of the calculation period. As an example, assume that a given agent attends a 60 minute training class at the start of a shift. Including the entire 60 minutes as valid work time in the occupancy calculation could cause that agent to not receive a call for many minutes after returning from the class. If the remaining agents had 80% occupancy, this agent might not get any calls for 15 minutes, since it might take that long for his or her occupancy to decline to 80%.

As is apparent from the above, there is a need for improved computation of occupancy measures in a call center, such that the resulting measures better reflect actual agent workload, particularly at agent log-in and in the presence of factors such as after call work and auxiliary work.

SUMMARY OF THE INVENTION

The invention generates occupancy measures for one or more agents in a call center in such a way that the above-noted problems associated with conventional occupancy computations are avoided. In an illustrative embodiment, a memory associated with the call center stores one or more values characterizing an occupancy measure determination for an agent or a set of agents, and the stored values are used in generating occupancy measures for the agents. The set of stored values for a given agent may include, for example, an initial occupancy value for the agent, expressed in terms of a percentage or in another suitable format. The occupancy measure for the agent may be set to the initial occupancy value upon a log-in by the agent, so as to avoid undue oscillation in the occupancy measure after log-in. The set of stored values for the given agent may also include, for example, limits relating to the impact of particular designated activities, such as after call work or auxiliary work performed by the agent, on the generation of the occupancy measure. Examples of such limits include a maximum amount of time which is to be considered as occupied time in generating the occupancy measure, or a maximum effect of a designated activity on the occupancy measure.

Advantageously, the invention permits an occupancy computation to be modified at the time an agent begins a shift and at other pre-designated events throughout the shift such that the resulting occupancy measures better reflect the actual workloads of the agents. More particularly, the use of an initial occupancy value and established limits on after call and auxiliary work contributions to occupancy can smooth out undesirable variations in occupancy computations. The invention thus provides more useful occupancy statistics, without the oscillations or other heavy effects that go beyond a reasonable definition of occupancy, for example, in applications in which occupancy is an enabler to a "fair" decision process. These and other features and advantages of the present invention will become more apparent from the accompanying drawings and the following detailed description.

BRIEF DESCRIPTION OF THE DRAWINGS

FIG. 1 is a block diagram of a call center that incorporates an illustrative embodiment of the invention.

FIG. 2 is a block diagram of an automatic call distribution (ACD) system of the call center of FIG. 1.

FIG. 3 is a flow diagram illustrating examples of occupancy computations which may be performed in the call center of FIG. 1 in accordance with the invention.

FIG. 4 shows an example illustrating the manner in which occupancy measures may be computed using the techniques of the invention.

DETAILED DESCRIPTION OF THE INVENTION

Although the invention will be illustrated below in conjunction with the processing of calls in an exemplary call center, it is not limited to use with any particular type of call center or communication processing application. For example, the invention is applicable to the processing of incoming communications, outgoing communications or both. The disclosed techniques can be can be used with automatic call distribution (ACD) systems, telemarketing systems, private-branch exchange (PBX) systems, computer-telephony integration (CTI)-based systems, as well as in combinations of these and other types of call centers. The term "call center" as used herein is thus intended to include any type of ACD system, telemarketing system or other communication system which processes calls or other service requests, including voice calls, video calls, multimedia calls, e-mail, faxes or voice messages as well as various combinations of these and other types of communications. The term "occupancy measure" as used herein should be understood to include any number, variable or other indication characterizing the workload of one or more agents in a call center, including, without limitation, occupancy measures expressed in terms of a percentage or a fraction. The term "activity" as used herein is intended to include any type of call or non-call activity, including, for example, after call work performed by an agent, auxiliary work performed by an agent, a training session attended by the agent, a meeting attended by the agent, a scheduled break taken by the agent, or any other categorization, classification or other indicator of an action which occurs in a call center.

FIG. 1 shows an illustrative call center in which the present invention may be implemented. The call center includes a number of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. The terminals 105 are connected to ACD system 101 by a voice-and-data transmission medium 109. The ACD system 101 includes a conventional basic call management system (BCMS) 110, and is also connected to a conventional external call management system (CMS) 111. The BCMS 110 and CMS 111 gather call records, call center statistics and other information for use in managing the call center, generating call center reports, and performing other functions. In alternative embodiments, the functions of the BCMS 110 and the CMS 111 may be provided using a single call management system internal or external to the ACD system 101.

The ACD system 101 may be implemented in a manner similar to, for example, the Definity® PBX-based ACD system from Lucent Technologies. FIG. 2 shows a simplified block diagram of one possible implementation of ACD system 101. The system 101 as shown in FIG. 2 is a stored-program-controlled system that includes interfaces 112 to external communication links, a communications switching fabric 113, service circuits 114 (e.g., tone generators, announcement circuits, etc.), a memory 115 for storing control programs and data, and a processor 116 (e.g., a microprocessor, a CPU, a computer, etc. or various portions or combinations thereof) for executing the stored control programs to control the interfaces and the fabric and to provide automatic call distribution functionality.

Referring again to FIG. 1, exemplary data elements stored in the memory 115 of ACD system 101 include a set of call queues 120 and a set of agent queues 130. Each call queue 121–129 in the set of call queues 120 corresponds to a different agent skill, as does each agent queue 131–139 in the set of agent queues 130. As in a conventional system, calls are prioritized, and may be, for example, enqueued in individual ones of the call queues 120 in their order of priority, or enqueued in different ones of a plurality of call queues that correspond to a skill and each one of which corresponds to a different priority. Similarly, each agent's skills are prioritized according to his or her level of expertise in that skill, and agents may be, for example, enqueued in individual ones of the agent queues 130 in their order of expertise level, or enqueued in different ones of a plurality of agent queues that correspond to a skill and each one of which corresponds to a different expertise level in that skill. It should be noted that the invention can also be implemented in systems using a wide variety of other types of queue arrangements and queuing techniques.

The ACD system 101 further includes a call vector 140. The call vector 140 may be one of a number of different types of stored control programs implemented in system 101. Calls incoming to the call center on lines or trunks 100 are assigned by call vector 140 to different call queues 121–129 based upon the agent skill that they require for proper handling. Agents 106–108 who are available for handling calls are assigned to agent queues 131–139 based upon the skills which they possess. An agent may have multiple skills, and hence may be assigned to multiple agent queues 131–139 simultaneously. Such an agent is referred to herein as a "multi-skill agent." Furthermore, an agent may have different levels of skill expertise (e.g., different skill levels in a multi-level scale or primary (P) and secondary (S) skills), and hence may be assigned to different agent queues 131–139 at different expertise levels. Call vectoring is described in greater detail in Definity® Communications System Generic 3 Call Vectoring/Expert Agent Selection (EAS) Guide, AT&T Publication No. 555-230-520, Issue 3, Nov. 1993, which is incorporated by reference herein. Skills-based ACD techniques are described in greater detail in, for example, U.S. Pat. No. 5,206,903, which is incorporated by reference herein.

Another program executing in ACD system 101 is an agent selector 150. Selector 150 may be implemented in software stored either in the memory 115 of system 101, in a peripheral memory (e.g., a disk, CD-ROM, etc.) of system 101, or in any other type of computer readable medium associated with system 101, and executed by processor 116 or other suitable processing hardware associated with the ACD system 101. Selector 150 in this exemplary embodiment implements conventional techniques for providing an assignment between available calls and available agents. The conventional techniques implemented by selector 150 are well known in the art and will not be further described herein. It should be noted that these functions could be implemented in other elements of the ACD system 101, or using a combination of a number of different elements in such a system. Further details regarding call processing in a system such as ACD system 101 can be found in, for example, U.S. patent application Ser. No. 08/813,513 filed Mar. 7, 1997 and entitled "Waiting Call Selection Based on Anticipated Wait Times," and U.S. patent application Ser. No. 09/022,959 filed Feb. 12, 1998 and entitled "Call Center Agent Selection that Optimizes Call Wait Times," both of which are incorporated by reference herein.

The call center of FIG. 1 includes a capability for computing occupancy measures for a given set of agents. This occupancy computation function may be implemented using one or more of the elements of the ACD system 101, such as, for example, the agent selector 150. More generally, the occupancy computation may be implemented by processor 116 of FIG. 2 using program instructions and other information stored in the memory 115. In other embodiments of the invention, other elements of the FIG. 1 call center or any other type of call center may be used to provide computation of occupancy measures. In accordance with the invention, the occupancy measures for the given set of agents are computed in such a way that the above-noted problems associated with conventional occupancy computation techniques are avoided.

FIG. 3 is a flow diagram showing occupancy computation features of an illustrative embodiment of the invention. It will be assumed without limitation that in the illustrative embodiment, the occupancy measures are computed by processor 116 of ACD 101 operating in conjunction with memory 115 to execute appropriate stored program instructions. In step 200, an initial occupancy value is set for each agent, each agent type, or for the call center as a whole. This initial occupancy value may be, for example, expressed in terms of a percentage and a time frame, and is used as the initial occupancy for the agent or agents at log-in. By initializing the initial occupancy of an agent to a specified value in this manner, the amount of time required for the agent to reach a relatively stable occupancy level is considerably reduced. The undue initial oscillation associated with conventional occupancy computation is therefore effectively eliminated.

Steps 210 and 220 of FIG. 3 illustrate the manner in which the invention can improve the usefulness of occupancy computation while also taking into account factors such as after call work (ACW) and auxiliary (AUX) work. In step 210, a limit is set on the amount of ACW time, e.g., in seconds or minutes, which is considered "occupied" time in the occupancy computation, and this limit may vary depending upon the type of skill involved in performing the ACW. Similarly, in step 220, a limit is set on the amount of AUX work time which may be considered occupied time in the occupancy computation, and this limit may vary depending on, e.g., an AUX work code identifying the type of AUX work. By setting limits on the amount of ACW and AUX work time which can be considered as occupied time, the resulting occupancy measures will better reflect the actual workloads of the agents.

In the flow diagram of FIG. 3, the occupancy measures are periodically computed for the agents in step 230, using the initial occupancy value or values established in step 200, and the ACW and AUX work limits set in respective steps 210 and 220. It should be noted that there is no particular ordering required for the steps 200–230 of FIG. 3, and one or more of these steps may be repeated periodically as required in a particular application. For example, the computation of the occupancy measures in step 230 may be repeated for each of a set of predetermined time intervals. In other implementations, the initial occupancy value or ACW and AUX limits may be varied depending on other factors such as time of day, call volume, etc. In addition, limits may be placed on quantities other than the amount of time which can be considered as occupied time. For example, a limit may be placed on the maximum effect of a given type of work on the occupancy computation, such as a limit on the number of percentage points that the occupancy can increase upon performance of that type of work.

It should be noted that many variations may be made in the illustrative occupancy computation process as shown in FIG. 3. The following are a number of possible variants of an occupancy computation process in accordance with the invention:

1. Each activity that an agent engages in can be administered to count as either work time, idle time, or ignored time in the occupancy computation.

2. A single instance of an activity might contribute to work time to some degree and to idle time to some degree, e.g., the first 10 minutes of an agent's break count as work time, but the remaining minutes count as idle time.

3. Over the course of a given unit of time, e.g., a shift, the first N incidences of an activity may be counted one way, and the remaining incidences counted another way. For example, an agent's first 3 bathroom breaks may be ignored, with any bathroom breaks after that counted as idle time.

4. Over the course of activities of a particular type or over the course of a set of identified activities, the first N minutes may count one way, with the remaining minutes counting another way. For example, the first 30 minutes of breaks may be counted as work time, whether that comes in the form of 3 breaks of 10 minutes each or 5 breaks of 6 minutes each, with the 31st minute and above counted as idle. As another example, scheduled breaks and spontaneous breaks, which may have different AUX codes, can be added together, with the total up to 30 minutes counted one way and all remaining minutes counted another way.

5. A given activity may be treated such that a particular percentage of that activity is counted one way and another percentage another way. For example, breaks may count 50% as work time, and 50% as ignored time.

6. A given activity could count partly as work time, partly as idle time, and partly as ignored time. For example, a first number of minutes may be counted as work time, a second number of subsequent minutes ignored, and the remaining minutes counted as idle time. Such an arrangement could be applied to accumulations of ACW. For example, the first 30 minutes of ACW across all skills the agent holds may be counted as work time, the next 15 minutes ignored, and any remaining minutes counted as idle time. Alternatively, a percentage, e.g., 70% of the activity is considered work, with another percentage, e.g., 30%, considered idle time. As another example, ACW in skill 5 may always count as work time, but the total among the other ACW in the remaining skills counts 70% as work time, and 30% ignored.

A measure of agent occupancy in accordance with the invention can be initialized in a number of different ways. For example, the agent occupancy may be initialized to the current, average occupancy of the corresponding call center or a similar group of agents. Other possibilities include initializing the agent occupancy based in part on the current average, e.g., the current average minus 3 percentage points, initializing to the last known occupancy of the agent from the last time he/she logged off the system, or initializing to an appropriate administered value. It should be noted that if an agent logs out and logs back in on what is considered a single shift, the accumulations against the various limits incurred in the first part of the shift can carry into the next part of the shift. Also, the limits on effect would still apply, in other words, when an activity code is administered, there might be a positive or negative limit on the effect it can have.

It should be noted that for any given type of activity or set of activities, the invention can be configured to allow different rules for different classes of agents. For example, the first 2 minutes of ACW on skill 4 may count as work time and the remaining time ignored for "mature" class agents, while "trainee" class agents may have the first 4 minutes of ACW on skill 4 counted as work time and the remaining time ignored. This feature may be particularly important in applications such as addressing local work rules issues in a global call center. An agent's class can be assigned across all skills, or uniquely for each skill in order to invoke the appropriate accounting rules for activities such as ACW which are associated with the skill of the call. In addition, an agent's class can be assigned across all AUX codes or uniquely for each AUX code in order to invoke the proper accounting rules for each AUX code.

FIG. 4 shows an example illustrating occupancy computations in accordance with the invention, for a given agent, using an initial occupancy value and ACW and AUX work limits established as described in conjunction with FIG. 3. The FIG. 4 example is presented in the form of a table in which: the first column indicates the time elapsed at the beginning of an event; the second column indicates the occupancy, in percentage terms, prior to the event; the third column specifies the event; the fourth column indicates the time elapsed at the end of the event; the fifth column specifies the "new" occupancy, i.e., the occupancy computed after the event, using the initial occupancy value and limits established as in FIG. 3; and the sixth column shows corresponding explanatory comments. The rows designated A, B, C and D in the table of FIG. 4 represent sample computations.

It will be assumed for the FIG. 4 example that the initial occupancy value for the given agent is 80%. It is also assumed that the agent performs after call work (ACW) for skill level 7, for which a limit of two minutes has been established. In addition, the agent performs tasks under an auxiliary (AUX) work code 4, for which a 15 minute limit has been established on the amount of time which can be considered as occupied time, and under an AUX work code 5, for which a maximum effect on the occupancy computation of +3 percentage points has been established. Finally, it is also assumed that the agent goes to lunch. This activity corresponds to an AUX work code 6, and none of the time spent on this activity is considered occupied time in the occupancy computation.

The first event in the FIG. 4 example is the log-in of the given agent. This event occurs at time 0:00. Prior to log-in, the occupancy of the agent is 0%. In accordance with the invention, the occupancy of the agent is initialized at log-in to the designated initial occupancy value, which, as previously noted, is assumed in this example to be 80%. Without this initialization, the initial occupancy for the agent upon log-in would have been 0%, and thus would tend to lead to the oscillation problems commonly associated with conventional occupancy computations. As shown in row A, at an elapsed time of 15 minutes, the agent has an occupancy of 84%, and begins to perform AUX work, corresponding to AUX code 5, which lasts for 15 minutes. Upon completion of this work, at an elapsed time of 30 minutes, the occupancy for the agent is 87%. This is due to the fact that AUX work code 5 has a limit of +3 percentage points in terms of its effect on the occupancy, and thus the occupancy can increase by no more than +3%, from 84% to 87%, even though the work took 15 minutes. Without this limit on effect, the occupancy increase would have been greater, e.g., 92% using conventional computation techniques. The details of the computation for row A, resulting in a new occupancy of 87%, are as follows:

$$\frac{(15 \cdot 84) + (15 \cdot 100)}{(15 + 15)} = \frac{1260 + 1500}{30} = 92\% > 84\% + 3\%$$

In row B, at the elapsed time of 30 minutes, the occupancy for the agent is 87%, and the agent talks for six minutes, and then begins to perform skill 7 ACW, which lasts for five minutes. Upon completion of the skill 7 ACW, the elapsed time is 41 minutes, and the new occupancy is 83.2%. This occupancy value reflects the fact that a maximum of 2 minutes of the skill 7 ACW is considered as occupied time, and the remaining portion is counted as idle time. Without the limit, the occupancy would have been greater, e.g., 90.5% The details of the computation for row B are as follows:

$$\frac{(30 \cdot 87) + (6 \cdot 100) + (2 \cdot 100) + ((5-2) \cdot 0)}{(30 + 6 + 5)} = \frac{2610 + 600 + 200}{41}$$
$$= \frac{3410}{41}$$
$$= 83.2\%.$$

In row C, at an elapsed time of 60 minutes, the occupancy for the agent is 86%, and the agent begins to perform AUX work corresponding to AUX work code 4. Upon completion of this AUX work, which lasts for 20 minutes, the elapsed time is 80 minutes, and the new occupancy is 83.3%. This occupancy value reflects the fact that a maximum of 15 minutes of the AUX work code 4 is considered as occupied time, and the remaining portion is counted as idle time. Without the limit, the occupancy would have been greater, e.g., 89.5%. The details of the computation for row C are as follows:

$$\frac{(60 \cdot 86) + (15 \cdot 100) + ((20-15) \cdot 0)}{(60 + 20)} = \frac{5160 + 1500}{80}$$
$$= \frac{6660}{80}$$
$$= 83.3\%.$$

In row D, at an elapsed time of 180 minutes, the agent performs AUX work code 6, i.e., goes to lunch, for 45 minutes. Upon completion of this activity, which as previously noted has no effect on the occupancy calculation, the new occupancy at the elapsed time of 225 minutes is unchanged at 81%. The details of the computation for row D are as follows:

$$\frac{(180 \cdot 81) + (0 \cdot 100)}{(180 + 0)} = 81\%.$$

The FIG. 4 example illustrates that use of an initial occupancy value and established limits on ACW and AUX work contributions to occupancy can smooth out undesirable variations in occupancy computations, such that the resulting occupancy measures better reflect actual workloads of the agents.

In alternative embodiments of the invention, the computation of occupancy may be delayed until some preset or variable interval of work time has elapsed, at which point the initial administered occupancy value is discarded and an actual calculated value is used, with or without the application of rules such as any rules applying to maximum effects. The initial value for a given agent may be set to a level that approximately matches the occupancy of the agents or a subset of the agents in a group, may be set at a lower value such that more work is directed to a newly logged-in agent, or may be set at a higher level to avoid sending work to a particular agent. Additionally, some agents may be administered with higher initial occupancy levels that are not subsequently recomputed. In this way, these agents are selected only if they are the only agent available, or if the other agents are all working hard as well. This type of occupancy assignment may be viewed as an example of a type of "false" high occupancy, and may be useful for a senior employee, a mentor/supervisor, etc.

The above-described embodiments of the invention are intended to be illustrative only. For example, it should be noted that the exemplary configuration of the call center shown in FIG. 1 may be altered to incorporate a wide variety of different arrangements of components to provide the occupancy computation functions described herein. In addition, as previously noted, the invention can be applied to a wide variety of communications, including faxes and e-mails. The initial occupancy values and work limits described above may be, for example, assigned administratively during design of the call handling process, or assigned through an application such as a computer-telephony integration (CTI) application. Other suitable techniques could also be used to assign appropriate initial values and limits. Furthermore, it should be noted that the invention may be implemented at least in part in the form of a computer-readable medium containing software which, when executed by a computer or other suitable type of processor, will cause the processor to implement the processing functions described above. For example, the BCMS 110, call vector 140, agent selector 150 and other elements of ACD system 101 may each be implemented as one or more software programs stored in memory 115 or any other computer readable medium associated with the ACD system 101, and executed by processor 116 or other processing hardware associated with the ACD system 101. These and numerous other alternative embodiments within the scope of the following claims will be apparent to those skilled in the art.

What is claimed is:

1. A method of determining an occupancy measure for an agent in a call center, the method comprising the steps of:
   storing at least one value characterizing at least a portion of an occupancy measure determination for the agent, the at least one value comprising one or more of (i) a non-zero initial occupancy value, and (ii) a limit specifying a maximum effect on the occupancy measure determination of a designated activity that may be performed by the agent; and
   generating an occupancy measure for the agent based on the at least one value.

2. The method of claim 1 wherein the storing step includes storing an initial occupancy value for the agent.

3. The method of claim 2 wherein the generating step further includes setting the occupancy measure to the initial occupancy value upon a log-in by the agent.

4. The method of claim 1 wherein the occupancy measure is expressed as at least one of a percentage and a fraction.

5. The method of claim 1 wherein the storing step includes storing a limit which specifies a maximum amount of time for a designated activity which is to be considered as occupied time in generating the occupancy measure.

6. The method of claim 1 wherein the storing step includes storing a limit which specifies a maximum effect of a designated activity on the occupancy measure.

7. The method of claim 1 wherein the storing step includes storing the at least one value for a designated activity performed by the agent.

8. The method of claim 7 wherein the designated activity is a designated type of non-call activity performed by the agent.

9. The method of claim 7 wherein the designated type of non-call activity includes at least one of after call work performed by the agent, auxiliary work performed by the agent, a training session attended by the agent, a meeting attended by the agent, and a scheduled break taken by the agent.

10. The method of claim 1 further including the step of delaying the generation of the occupancy measure for the agent, such that an initial occupancy value is used in its place, until at least one of (i) a specified interval of work time has elapsed, and (ii) a specified number of calls have been received by the agent.

11. The method of claim 1 further including the step of establishing a different initial value for the occupancy measure for the agent than for a corresponding occupancy measure for at least one other agent, in order to adjust relative work loads of the agents.

12. The method of claim 1 wherein the storing step includes storing, for each activity in a set of activities that the agent engages in, an indicator of a corresponding portion of that activity which may be designated as at least one of work time, idle time, and ignored time in computation of the occupancy measure.

13. The method of claim 12 wherein the indicators for a given activity are different for different classes of agents, and the class for a given agent is assigned either across all of the skills in a given set of skills or uniquely for each skill in at least a subset of the set of skills.

14. The method of claim 12 further including the steps of counting at least one of (i) an amount of accumulated time over an event of a particular type, and (ii) a number of events of a particular type or types, for which a given set of indicators are used by the agent, and utilizing a different set of indicators for the agent after a designated count has been reached.

15. An apparatus for processing communications in a call center, the apparatus comprising:
   a memory for storing at least one value characterizing at least a portion of an occupancy measure determination for the agent, the at least one value comprising one or more of (i) a non-zero initial occupancy value, and (ii) a limit specifying a maximum effect on the occupancy measure determination of a designated activity that may be performed by the agent; and
   a processor coupled to the memory and operative to generate an occupancy measure for the agent based on the at least one value.

16. The apparatus of claim 15 wherein the at least one value characterizing at least a portion of an occupancy measure determination for the agent is an initial occupancy value for the agent.

17. The apparatus of claim 16 wherein the processor is further operative to generate the occupancy measure for the agent by setting the occupancy measure to the initial occupancy value upon a log-in by the agent.

18. The apparatus of claim 15 wherein the occupancy measure is expressed as at least one of a percentage and a fraction.

19. The apparatus of claim 15 wherein the at least one value characterizing at least a portion of an occupancy measure determination for the agent includes a limit which specifies a maximum amount of time for a designated activity which is to be considered as occupied time in generating the occupancy measure.

20. The apparatus of claim 15 wherein the at least one value characterizing at least a portion of an occupancy measure determination for the agent includes a limit which specifies a maximum effect of a designated activity on the occupancy measure.

21. The apparatus of claim 15 wherein the at least one value characterizing at least a portion of an occupancy measure determination for the agent includes at least one value for a designated activity performed by the agent.

22. The apparatus of claim 21 wherein the designated activity is a designated type of non-call activity performed by the agent.

23. The apparatus of claim 22 wherein the designated type of non-call activity includes at least one of after call work performed by the agent, auxiliary work performed by the agent, a training session attended by the agent, a meeting attended by the agent, and a scheduled break taken by the agent.

24. The apparatus of claim 15 wherein the generation of the occupancy measure for the agent is delayed, such that an initial occupancy value is used in its place, until at least one of (i) a specified interval of work time has elapsed, and (ii) a specified number of calls have been received by the agent.

25. The apparatus of claim 15 wherein a different initial value is established for the occupancy measure for the agent than for a corresponding occupancy measure for at least one other agent, in order to adjust relative work loads of the agents.

26. The apparatus of claim 15 wherein the memory stores, for each activity in a set of activities that the agent engages in, an indicator of a corresponding portion of that activity which may be designated as at least one of work time, idle time, and ignored time in computation of the occupancy measure.

27. The apparatus of claim 26 wherein the indicators for a given activity are different for different classes of agents, and the class for a given agent is assigned either across all of the skills in a given set of skills or uniquely for each skill in at least a subset of the set of skills.

28. The apparatus of claim 26 wherein the processor is further operative to count at least one of (i) an amount of accumulated time over an event of a particular type, and (ii) a number of events of a particular type or types, for which a given set of indicators are used by the agent, and to utilize a different set of indicators for the agent after a designated count has been reached.

29. The apparatus of claim 15 wherein the memory and the processor are elements of an automatic call distribution system.

30. An article of manufacture containing software which, when executed in a processor, causes the processor to perform the steps of:

storing at least one value characterizing at least a portion of an occupancy measure determination for an agent in a call center, the at least one value comprising one or more of (i) a non-zero initial occupancy value, and (ii) a limit specifying a maximum effect on the occupancy measure determination of a designated activity that may be performed by the agent; and generating an occupancy measure for the agent based on the at least one value.

31. A method of determining an occupancy measure for an agent in a call center, the method comprising the steps of:

storing at least one value characterizing at least a portion of an occupancy measure determination for the agent; and generating an occupancy measure for the agent based on the at least one value;

wherein the storing step includes storing the at least one value for a designated activity performed by the agent, the designated activity being a designated type of non-call activity performed by the agent, and wherein the designated type of non-call activity includes at least one of after call work performed by the agent, auxiliary work performed by the agent, a training session attended by the agent, a meeting attended by the agent, and a scheduled break taken by the agent.

32. An apparatus for processing communications in a call center, the apparatus comprising:

a memory for storing at least one value characterizing at least a portion of an occupancy measure determination for the agent; and a processor coupled to the memory and operative to generate an occupancy measure for the agent based on the at least one value;

wherein the at least one value characterizing at least a portion of an occupancy measure determination for the agent includes at least one value for a designated activity performed by the agent, the designated activity being a designated type of non-call activity performed by the agent, and wherein the designated type of non-call activity includes at least one of after call work performed by the agent, auxiliary work performed by the agent, a training session attended by the agent, a meeting attended by the agent, and a scheduled break taken by the agent.

33. A method of determining an occupancy measure for an agent in a call center, the method comprising the steps of:

storing at least one value characterizing at least a portion of an occupancy measure determination for the agent; and generating an occupancy measure for the agent based on the at least one value;

wherein the storing step includes storing, for each activity in a set of activities that the agent engages in, an indicator of a corresponding portion of that activity which may be designated as at least one of work time, idle time, and ignored time in computation of the occupancy measure.

34. An apparatus for processing communications in a call center, the apparatus comprising:

a memory for storing at least one value characterizing at least a portion of an occupancy measure determination for the agent; and a processor coupled to the memory and operative to generate an occupancy measure for the agent based on the at least one value;

wherein the memory stores, for each activity in a set of activities that the agent engages in, an indicator of a corresponding portion of that activity which may be designated as at least one of work time, idle time, and ignored time in computation of the occupancy measure.

* * * * *

UNITED STATES PATENT AND TRADEMARK OFFICE
CERTIFICATE OF CORRECTION

PATENT NO.   : 6,359,982 B1
DATED        : March 19, 2002
INVENTOR(S)  : Foster et al.

It is certified that error appears in the above-identified patent and that said Letters Patent is hereby corrected as shown below:

<u>Title page,</u>
Item [73], the Assignee name is changed from "Avaya Technologies Corp." to
-- Avaya Technology Corp. --

Item [74], *Attorney, Agent, or Firm* is changed from "Evans, Mason & Lewis, LLP" to
-- Ryan, Mason & Lewis, LLP --

Signed and Sealed this

Third Day of September, 2002

*Attest:*

*Attesting Officer*

JAMES E. ROGAN
*Director of the United States Patent and Trademark Office*